United States Patent [19]

Li

[11] Patent Number: 5,799,917

[45] Date of Patent: Sep. 1, 1998

[54] ADJUSTABLE SUPPORTING BRACKET

[76] Inventor: Chin-Chu Li, No. 1-4, Wu Nan Rd., Wu Chi Chen, Taichung Hsien, Taiwan

[21] Appl. No.: 767,874

[22] Filed: Dec. 17, 1996

[51] Int. Cl.⁶ ..................................................... E04G 3/00
[52] U.S. Cl. ................................ 248/284.1; 248/286.1; 248/921
[58] Field of Search ........................... 248/284.1, 279.1, 248/286.1, 281.11, 292.11, 918, 181.2, 920, 921

[56] References Cited

U.S. PATENT DOCUMENTS

| | | | |
|---|---|---|---|
| 4,562,987 | 1/1986 | Leeds et al. | 248/921 |
| 4,691,886 | 9/1987 | Wendung et al. | 248/920 |
| 4,768,744 | 9/1988 | Leeds et al. | 248/921 |
| 4,844,387 | 7/1989 | Sorgi et al. | 248/281.11 |
| 5,553,820 | 9/1996 | Karten et al. | 248/286.1 |

*Primary Examiner*—Ramon O. Ramirez
*Assistant Examiner*—Anita M. King
*Attorney, Agent, or Firm*—Morton J. Rosenberg; David I. Klein; Jun Y. Lee

[57] ABSTRACT

An adjustable supporting bracket which includes a supporting arm, an anchoring base and a supporting bracket is provided. A linkage is attached to the lower end of the gas cylinder (or spring member). The linkage is provided with a pair of sliding shafts which in turn are slidably received within a pair of corresponding grooves disposed under the supporting arm. The linkage is provided with a threaded socket at the rear central portion. An adjusting bolt is disposed with the threaded socket. A coil spring member is enveloped at the bolt and disposed located between the bolt head and the threaded socket. By this arrangement, the threads are prevented from being readily worn out while the bolt can be rotated smoothly.

3 Claims, 6 Drawing Sheets

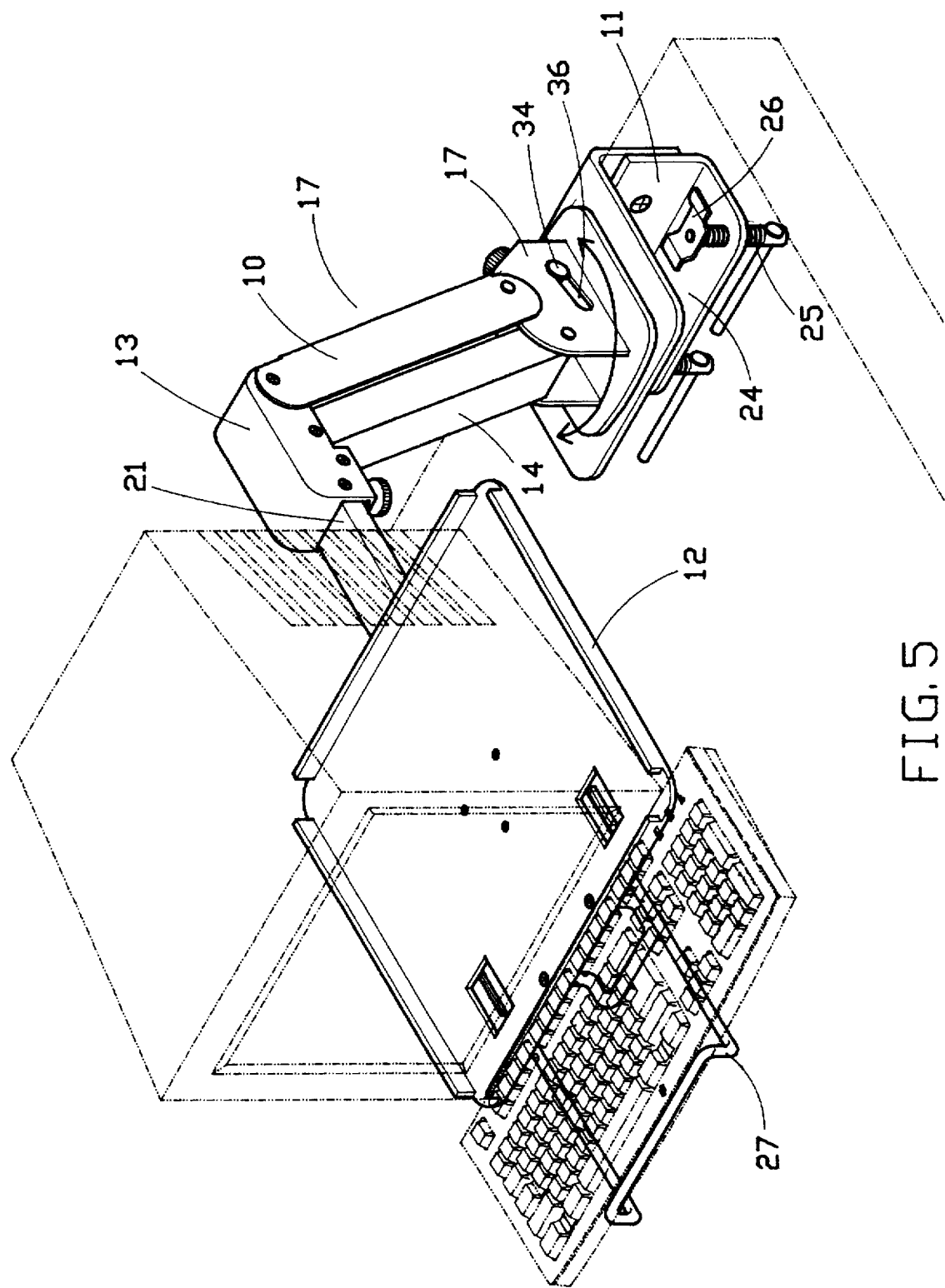

5,799,917

ADJUSTABLE SUPPORTING BRACKET

FIELD OF THE INVENTION

The present invention relates to an adjustable supporting bracket, more particularly, to an adjustable supporting bracket wherein the threads can be prevented from being worn out while the adjustment of the supporting bracket is more smoothly.

DESCRIPTION OF PRIOR ART

Referring to FIG. 1, the supporting bracket is used to support the monitor or the likes. In the conventional supporting bracket, the supporting bracket generally includes a supporting arm assembly 10a. The lower end of the supporting arm assembly 10a is disposed with an anchoring base 11a which can be attached to a supporting element. The supporting arm assembly 10a is pivoted thereof a supporting bracket assembly 12a for securely support a monitor thereof. A compressed gas cylinder or spring member 13a is disposed within the supporting arm assembly 10a. One end of the telescopic rod of the gas cylinder 13a is pivotally connected to the supporting arm assembly 10a. The lower end of the gas cylinder 13a is disposed with a fixing base 14a wherein a threaded opening and an adjusting blot 15a are provided. The gas cylinder 13a can be supported at its lower end to support the supporting arm assembly 10a. In order to support different load, the adjusting bolt 15a can be rotated to move the fixing base 14a, accordingly, the triangular supporting relationship provided by the gas cylinder 13a is adapted to meet the new load distribution. As a result, the new load can be adequately supported.

Nevertheless, the fixing base 14a which is used to move the lower end of the gas cylinder 13a is actuated by the adjusting bolt 15a, a stress concentration will be located between the thread of the bolt 15a and the threaded opening, consequently, the threads both on threaded opening and adjusting bolt 15a will readily worn out. As a result, the supporting bracket is malfunctioned.

SUMMARY OF THE INVENTION

It is the object of this invention to provide an adjustable supporting bracket wherein the threads can be prevented from being worn out while the adjustment of the supporting bracket is more smoothly.

In order to achieve the object set forth, the adjustable supporting bracket made according to this invention is featured that a linkage is attached to the lower end of the gas cylinder. The linkage is provided with a pair of sliding shafts which in turn are slidably received within a pair of corresponding grooves disposed under the supporting arm. The linkage is provided with a threaded socket at the rear central portion. An adjusting bolt is disposed with the threaded socket. A coil spring member is enveloped at the bolt and disposed located between the bolt head and the threaded socket. By this arrangement, the threads are prevented from being readily worn out while the bolt can be rotated smoothly.

BRIEF DESCRIPTION OF THE DRAWINGS

In order that the present invention may more readily be understood the following description is given, merely by way of example with reference to the accompanying drawings, in which:

FIG. 5 is a schematic illustration showing the application of the adjustable supporting bracket made according to this invention.

| Brief Description of Numerals | | | |
|---|---|---|---|
| 10 | supporting arm | 11 | anchoring base |
| 12 | supporting bracket | 13 | supporting arm member |
| 14 | supporting arm member | 15 | pivoting shaft |
| 16 | pivoting shaft | 17 | fixing base |
| 18 | gas cylinder | 19 | adjusting bolt |
| 20 | screw | 21 | holding base |
| 22 | supporting rod | 23 | screw |
| 24 | lower anchoring clip | 25 | adjusting blot |
| 26 | biasing plate | 27 | supporting bracket |
| 28 | threaded opening | 29 | locking screw |
| 30 | through hole | 31 | linkage |
| 32 | locking screw | 33 | linking shaft |
| 34 | sliding shaft | 35 | threaded socket |
| 36 | sliding groove | 37 | coil spring |
| 38 | rotating knob | 11a | fixing base |
| 10a | supporting arm | 13a | gas cylinder |
| 12a | supporting bracket | 15a | adjusting bolt |
| 14a | fixing base | | |

DETAILED DESCRIPTION OF PREFERRED EMBODIMENT

Figure 1:
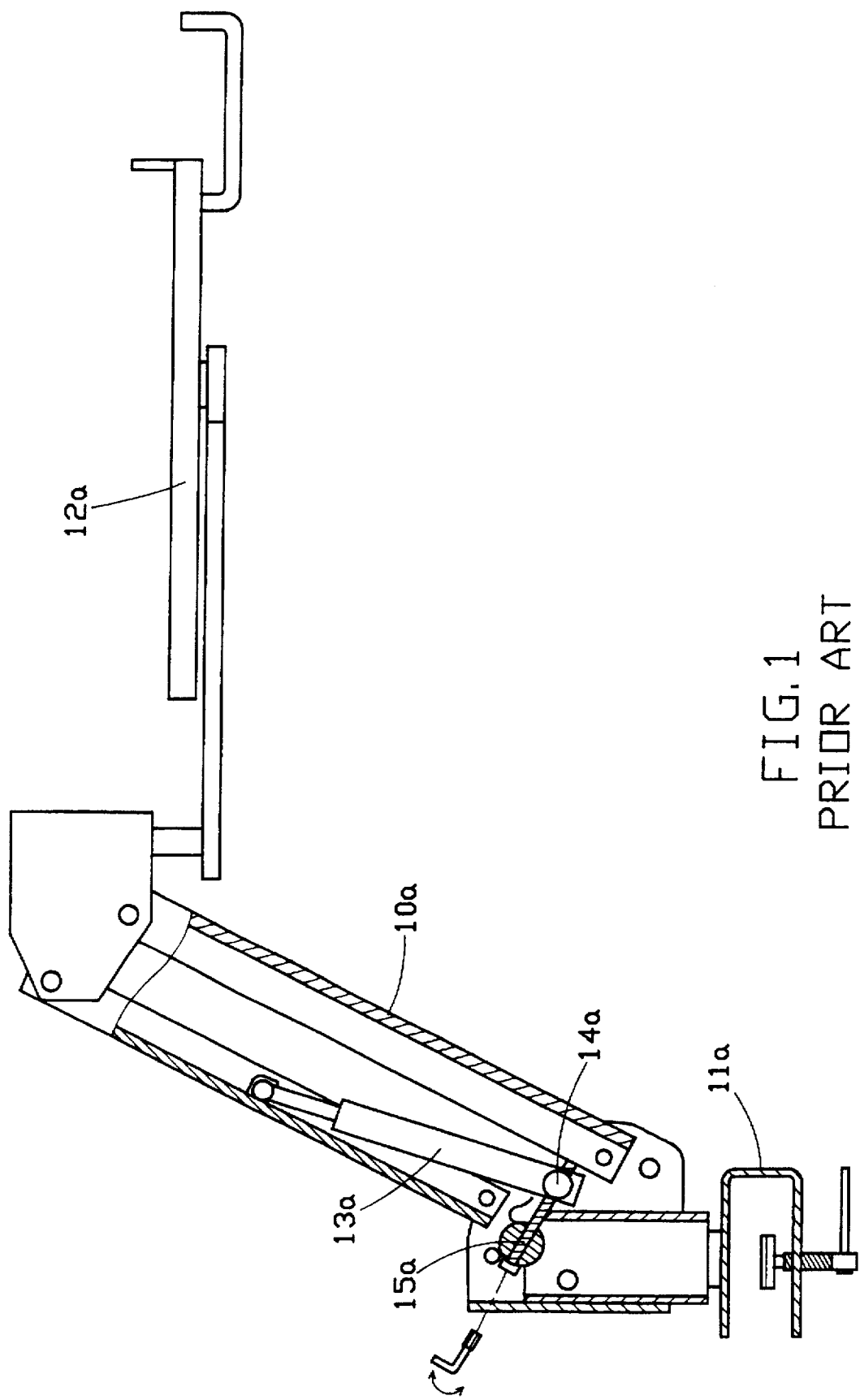
FIG. 1 is a side elevational view showing a conventional supporting bracket.
Figure 2:
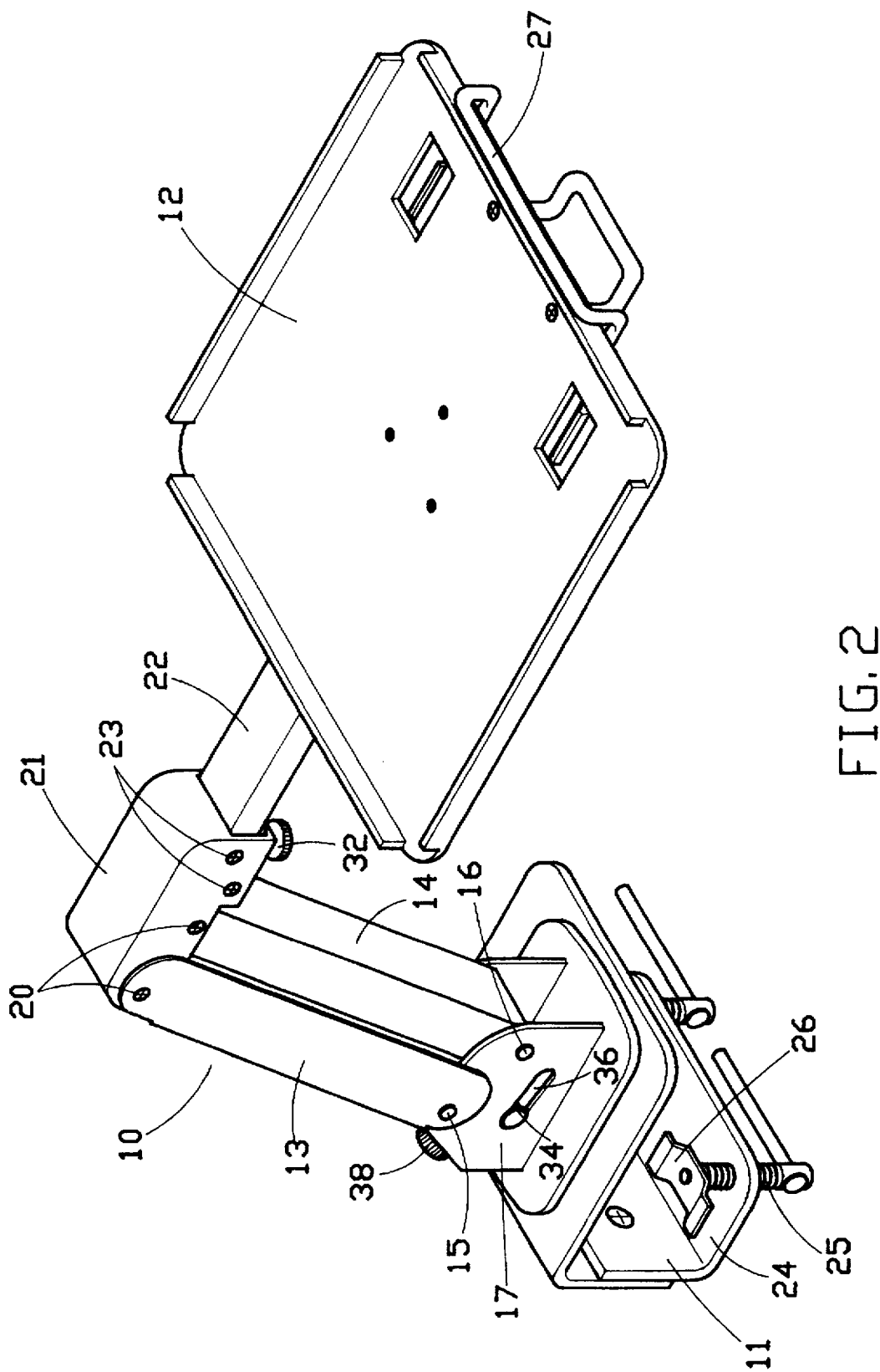
FIG. 2 is a perspective view of the adjustable supporting bracket made according to this invention.
Figure 3:
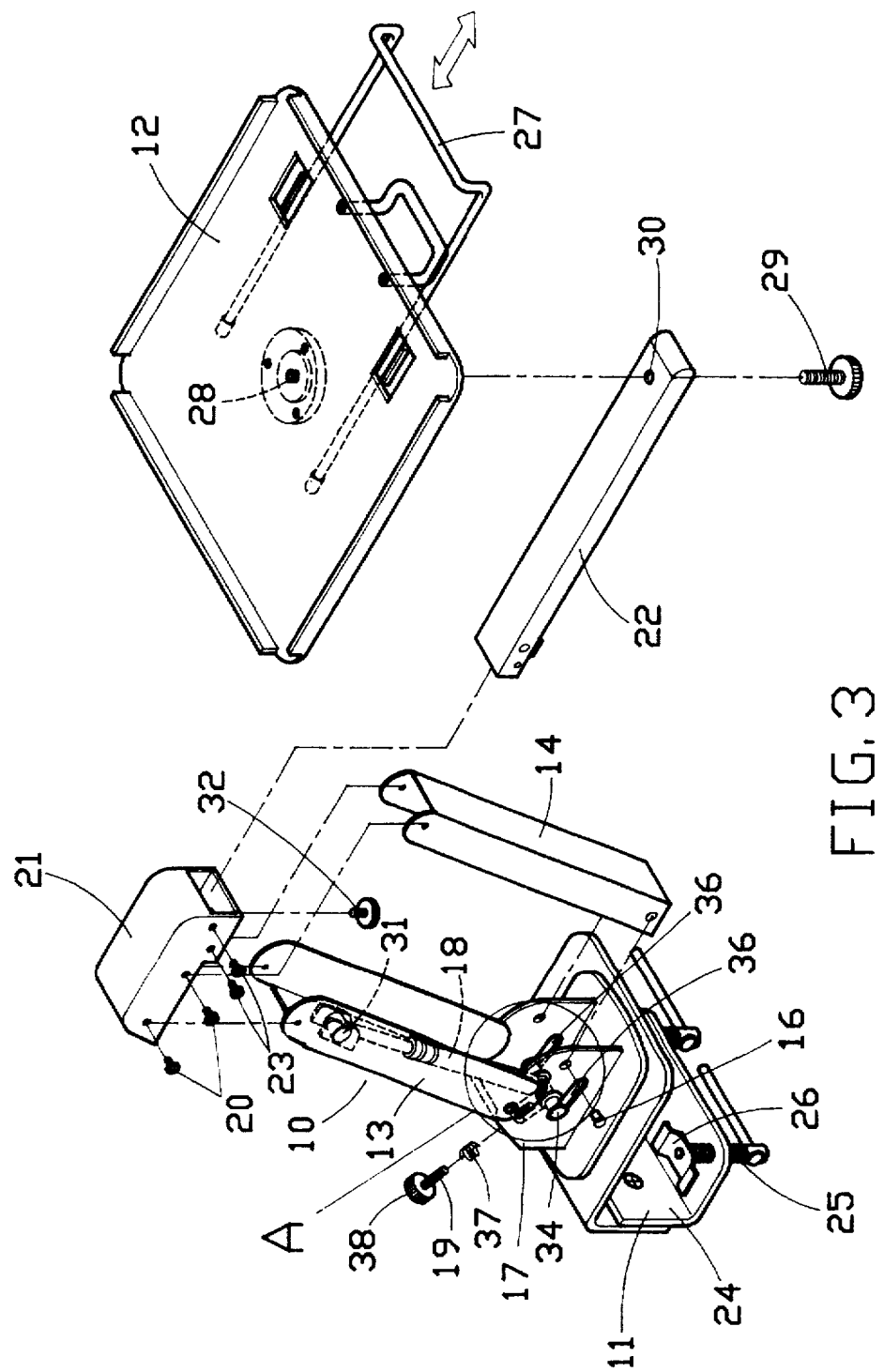
FIG. 3 is an exploded perspective view of the adjustable supporting bracket made according to this invention.
Figure 3A:
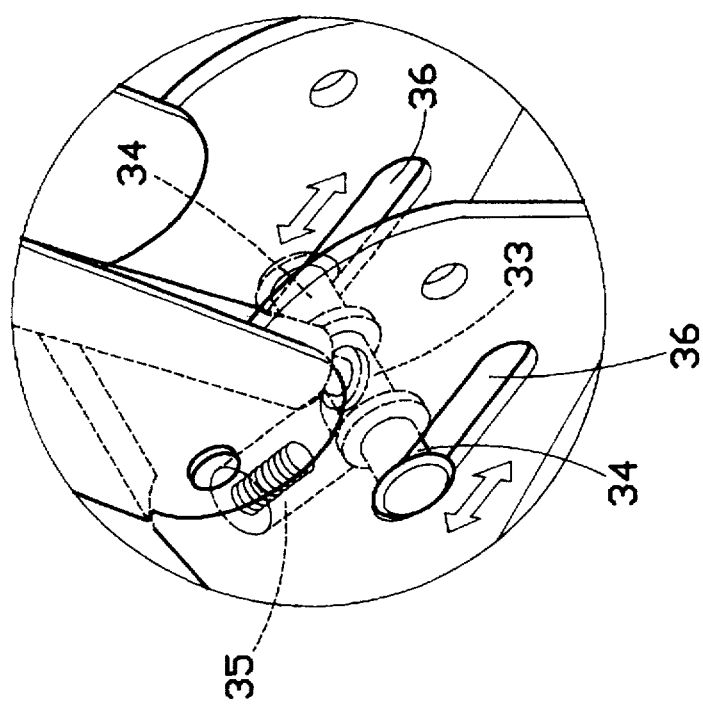
FIG. 3A is an enlarged view of section A of FIG. 3.
Figure 4:
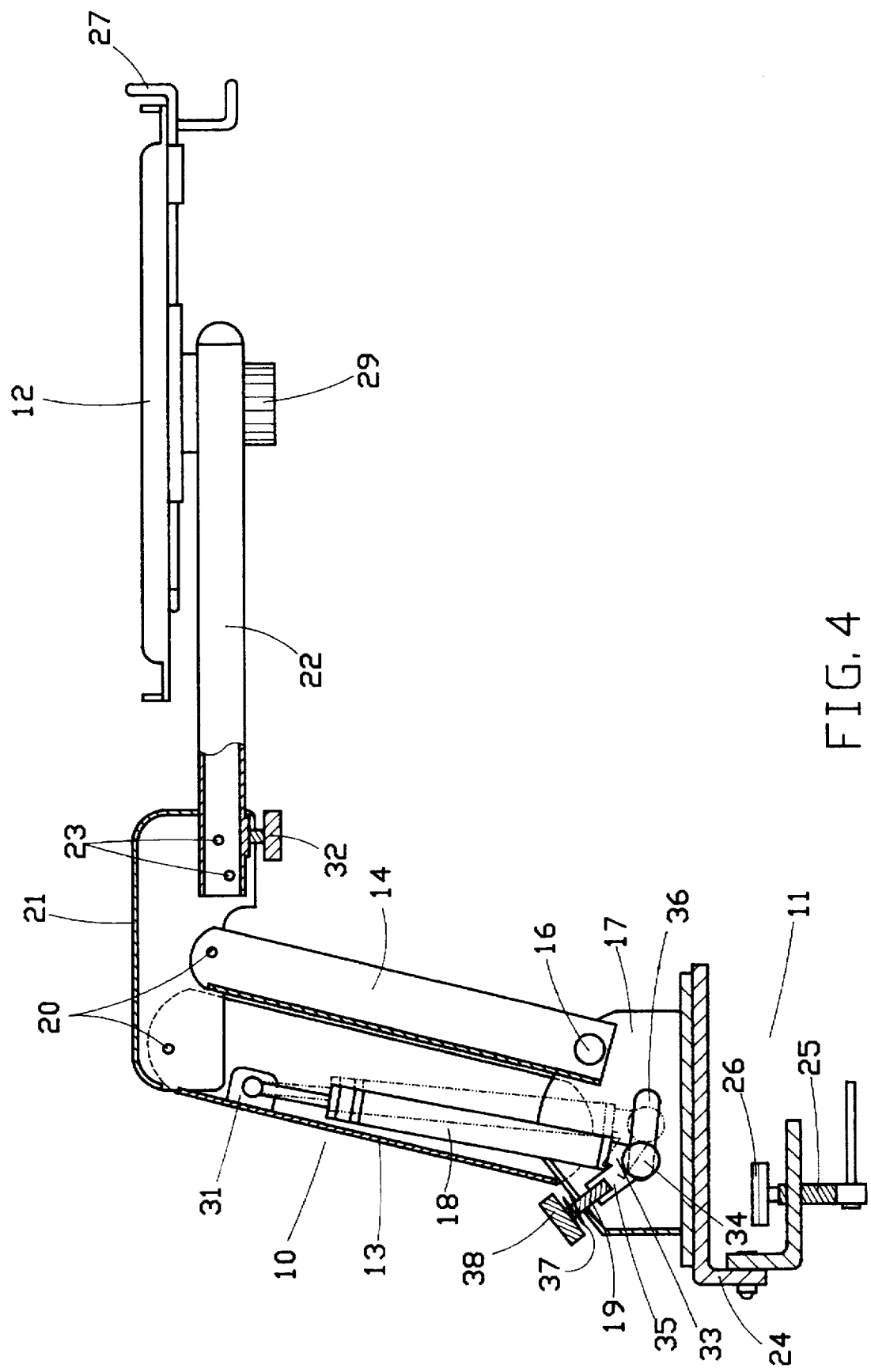
FIG. 4 is a side elevational view showing the adjustable supporting bracket made according to this invention.

Referring to FIGS. 2, 3 and 4, which disclose respectively the perspective view, exploded perspective view and side elevational view, the adjustable supporting bracket made according to this invention generally comprises a supporting arm assembly 10, an anchoring base 11 and a supporting bracket assembly 12. The supporting arm assembly 10 is configured by a pair of supporting arm members 13, 14 wherein a hollow space is defined therebetween. Those two supporting arm members 13, 14 are pivotally connected to the fixing base 17 via a pair of pivoting shafts 15, 16 respectively. A compressed gas cylinder 18 is disposed within the supporting arm 11. The telescopic rod of the gas cylinder 18 is pivotally connected to the linkage 31 disposed atop of the supporting arm members 13, 14. Accordingly, the supporting arm assembly 10 can be well supported by the gas cylinder 18 as the lower end of the gas cylinder 18 is well supported. The lower end of the gas cylinder 18 is displaceable as actuated by an adjusting bolt 19. Consequently, the triangular supporting relationship can be adapted to meet the load distribution. Alternatively, the gas cylinder 18 can be replaced with other suitable spring member.

The top of the supporting arm members 13, 14 of the supporting arm assembly 10 are attached with a holding base 21 via screw members 20. The holding base 21 is attached with a supporting rod 22 which is securely fixed by screw 23 and locking screw 32 such that the supporting rod 22 extends horizontally and outward from the supporting arm assembly 10.

The lower end portion of the supporting arm assembly 10 is pivotally connected to the fixing base 17 which in turn is connected to the anchoring base 11. The anchoring base 11 has an U-shape anchoring clip 24. An adjusting bolt 25 is disposed at the anchoring clip 24 and the bolt 25 is provided with a biasing plate 26 atop. By the rotation of the bolt 25, the biasing plate 26 can be moved up or down such that the anchoring base 11 can be securely attached to a supporter.

The supporting bracket assembly 12 has a flat configuration having a drawer-type supporting bracket 27 thereof. The central portion of the supporting bracket 27 is provided with threaded opening 28 for receiving a screw 29 which passes the through hole 30 which pass through the supporting rod 22. Then this screw 29 can be screwed in the threaded hole 28 disposed at the bottom of the supporting bracket assembly 12. Consequently, the supporting bracket assembly 12 is locked to the front portion of the supporting rod 22. As a result, a monitor or the like can be disposed atop of the supporting bracket 27, as clearly shown in FIG. 5. The supporting bracket 27 can be extended from the supporting bracket assembly 12 for supporting a keyboard. Nevertheless, this is known to the skilled in the art and no more detailed description is given.

The lower end of the gas cylinder 18 is disposed with a linking shaft 33 having a pair of sliding shafts 34 at both sides. The free end of the sliding shafts 34 can be slidably received within the sliding grooves 36 of the fixing base 17 disposed at the lower end of the supporting arm assembly 10. The rear central portion is disposed with a threaded socket 35. The top of the adjusting blot 19 is disposed with a rotating knob 38 which is located at outside of the fixing base 17. The adjusting bolt 19 is screwed into the threaded socket 35 from back side of the fixing base 17 and is locked with the threaded socket 35. A spring 37 is enveloped onto the adjusting bolt 19 and is located between the rotating knob 38 and the fixing base 17. The supporting arm assembly 10 is well supported by the gas cylinder 18. When a different load distribution resulted from different monitor or the like occur, the adjusting bolt 19 can be suitably rotated through the rotating knob 38, consequently, the lower end of the gas cylinder 18 is moved and adapted to meet the new load distribution via the adapted triangular supporting relationship. As a result, the new monitor can be well supported.

Since the connection between the adjusting bolt 19 and the lower end of the gas cylinder 18 through a threaded socket 35. Accordingly, the lower end of the gas cylinder 18 is indirectly moved by the adjusting bolt 19. On the other hand, the load distribution can be evenly distributed to both sliding shafts 34 disposed at both sides. By this arrangement, the threads can be prevented from being worn out. By the way, the adjusting bolt 19 can be moved smoothly. Furthermore, from the location of the sliding shafts 35 on the sliding grooves 36, the position can be readily recognized.

From the forgoing description, the problem encountered by the conventional supporting bracket can be completely solved by the provision of the invention.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:
1. An adjustable supporting bracket comprising:
   a supporting arm assembly having a lower end pivotally connected to a fixing base, a gas cylinder being disposed within said supporting arm assembly and connected to the fixing base, an adjusting bolt having a rotating knob, the supporting arm assembly, the gas cylinder and the fixing base defining a triangular supporting relationship, when said rotating knob is rotated, the gas cylinder moves relative to the fixing base and the triangular supporting relationship changes to accommodate different load distributions;
   an anchoring base disposed beneath the fixing base and is pivotally attached to the lower end of said supporting arm assembly; and
   a supporting bracket assembly being locked to a front portion of the supporting arm assembly and characterized in that a lower end of said gas cylinder is disposed with a linking shaft having a pair of sliding shafts at both sides, the free end of said sliding shafts are slidably received within sliding grooves of said fixing base disposed at the lower end of said supporting arm assembly for adjusting the position of the gas cylinder with respect to the fixing base, a rear central portion being disposed with a threaded socket, the top of said adjusting bolt being disposed with said rotating knob which is located outside of the fixing base, said adjusting bolt being screwed into said threaded socket from a back side of said fixing base and locked with said threaded socket, and a spring being enveloped onto said adjusting bolt and being located between said rotating knob and said fixing base for preventing threads of the adjusting bolt from being readily worn out.

2. The adjustable supporting bracket as recited in claim 1, wherein said supporting arm assembly is configured by a pair of supporting arm members wherein a hollow space is defined therebetween, said two supporting arm members are pivotally connected to the fixing base respectively, the top of said supporting arm members of the supporting arm assembly are attached with a holding base, the holding base is attached with a supporting rod extending horizontally thereof, the central portion of the supporting bracket is provided with a threaded opening for receiving a screw within a through hole which pass through the supporting rod, then this screw can be screwed in the threaded opening disposed at the bottom of the supporting bracket assembly, consequently, the supporting bracket assembly is locked to a front portion of the supporting rod.

3. The adjustable supporting bracket as recited in claim 1, wherein said gas cylinder can be replaced with a spring.

* * * * *